United States Patent [19]

Laumeister

[11] Patent Number: 5,209,032
[45] Date of Patent: May 11, 1993

[54] ASSEMBLY FOR PREVENTING PIGEONS FROM ENTERING THE SPACE BETWEEN A PAIR OF ADJACENT I-BEAMS OF A BRIDGE

[76] Inventor: Thomas D. Laumeister, 185 Freedom St., Hopedale, Mass. 01747

[21] Appl. No.: 783,259

[22] Filed: Oct. 28, 1991

[51] Int. Cl.⁵ .............................................. E04B 1/72
[52] U.S. Cl. ..................................... 52/101; 52/507; 52/749
[58] Field of Search ............... 52/101, 324, 326, 407, 52/507, 360

[56] References Cited

U.S. PATENT DOCUMENTS

| | | | |
|---|---|---|---|
| 587,059 | 7/1897 | Moffat | 52/370 |
| 1,220,915 | 3/1917 | Wells | 52/326 |
| 1,805,797 | 5/1931 | Bates | 52/749 |
| 1,898,736 | 2/1933 | Melvin | 52/360 |
| 3,367,078 | 2/1968 | Thompson | 52/507 |
| 4,937,988 | 7/1990 | Gratton | 52/101 |

Primary Examiner—Richard E. Chilcot, Jr.
Assistant Examiner—Beth A. Aubrey
Attorney, Agent, or Firm—Kriegsman & Kriegsman

[57] ABSTRACT

An assembly for preventing pidgeons for entering the space between a pair of adjacent I-beams of a bridge or similar structure. In one embodiment, the assembly comprises a pair of generally C-shaped plastic clips and a generally rectangular plastic sheet. The clips are adapted to be mounted around the bottom surface and the lower inner and lower outer flanges of the I-beam. The plastic sheet is dimensioned so as to extend across the space between the pair of adjacent I-beams and to rest on top of the inner flanges of the I-beams. A plurality of small openings are formed in the plastic sheet. The pair of generally C-shaped clips are inserted through a pair of respective openings located on opposite sides of the plastic sheet.

5 Claims, 6 Drawing Sheets

ASSEMBLY FOR PREVENTING PIGEONS FROM ENTERING THE SPACE BETWEEN A PAIR OF ADJACENT I-BEAMS OF A BRIDGE

BACKGROUND OF THE INVENTION

The present invention relates to an assembly for preventing pidgeons from entering the space between a pair of adjacent I-beams of a bridge, and in so doing, preventing the pidgeons from nesting, among other places, on the lower inner flanges of the adjacent I-beams.

In areas where pidgeons are in abundance, such as in urban areas, it is not uncommon for pidgeons to nest on the undersides of the transverse portions of bridges and, in particular, to nest on top of the lower flanges of steel I-beams which commonly form the structural support for the transverse portions of bridges. As can readily be appreciated, such nesting on the I-beams is a nuisance to pedestrians and commuters passing under the bridge who are subjected to droppings from the pidgeons. In addition, such nesting on the I-beams often leads to pidgeon droppings being deposited on the I-beams, which droppings are capable of causing corrosion of the I-beams and, ultimately, leading to structural damage to the bridge. One approach to this problem has involved placing metal chicken wire over the space between adjacent I-beams and welding the ends of the chicken wire to the bottom of the adjacent I-beams so as to prevent the pidgeons from being able to nest on top of the lower inner flanges of the adjacent I-beams. However, as is typically the case when two dissimilar metal are placed in contact, the placing in contact of the metal chicken wire with the steel I-beams typically results in corrosion of the I-beams. Such corrosion is further hastened by the use of a metal weld to fix the chicken wire to the I-beams.

Other approaches to the problem have included laying wooden planks or cotton netting across the lower inner flanges of adjacent I-beams in such a way as to seal off the space between the adjacent I-beams. These approaches, however, typically suffer from the fact that the wooden planks or cotton netting soon rot from exposure to outdoor conditions and must be replaced and/or from the fact that the wooden planks or cotton netting are not secured to the I-beams and can be displaced therefrom from high winds or the like.

SUMMARY OF THE INVENTION

It is an object of the present invention to provide a novel assembly for preventing pidgeons from entering the space between a pair of adjacent I-beams of a bridge so as to prevent such pidgeons from nesting, for example, on the lower inner flanges of the pair of adjacent I-beams.

It is another object of the present invention to provide an assembly as described above which, when mounted on a pair of adjacent I-beams of abridge, does not cause corrosion thereof.

It is still another object of the present invention to provide an assembly as described above which can be mounted on a pair of adjacent I-beams of a bridge without requiring the workmanship of skilled laborers, such as welders.

It is still yet another object of the present invention to provide an assembly as described above which can be securely yet removably mounted on a pair of adjacent I-beams of a bridge.

It is still a further object of the present invention to provide an assembly as described above which can be mass produced.

It is still yet a further object of the present invention to provide an assembly as described above which is capable of withstanding typical weather conditions for many years.

Additional objects, as well as features and advantages, of the present invention will be set forth in part in the description which follows and in part will be obvious from the description which follows or may be learned by practice of the invention. The objects of the invention also may be realized and attained by means of the instrumentalities and combinations particularly pointed out in the appended claims.

In accordance with the purpose of the present invention as broadly set forth above, an assembly is provided for preventing pidgeons from entering the space between a pair of adjacent I-beams of a bridge, each of the pair of adjacent I-beams having a bottom surface, a lower inner flange extending towards the space between the pair of adjacent I-beams, and a lower outer flange extending away from the space between the pair of adjacent I-beams, the assembly comprising in one embodiment a plastic sheet, said plastic sheet being dimensioned so as to extend over the space between the pair of adjacent I-beams and to rest on top of the lower inner flanges of the pair of adjacent I-beams and plastic fastener means for securing said plastic sheet to at least one of the lower inner flanges of the pair of adjacent I-beams.

BRIEF DESCRIPTION OF THE DRAWINGS

The accompanying drawings, which are hereby incorporated into and constitute a part of this specification, illustrate the preferred embodiments of the invention and, together with the description, serve to explain the principles of the invention. In the drawings wherein like reference numerals represent like parts.

DETAILED DESCRIPTION OF PREFERRED EMBODIMENTS

Figure 1:
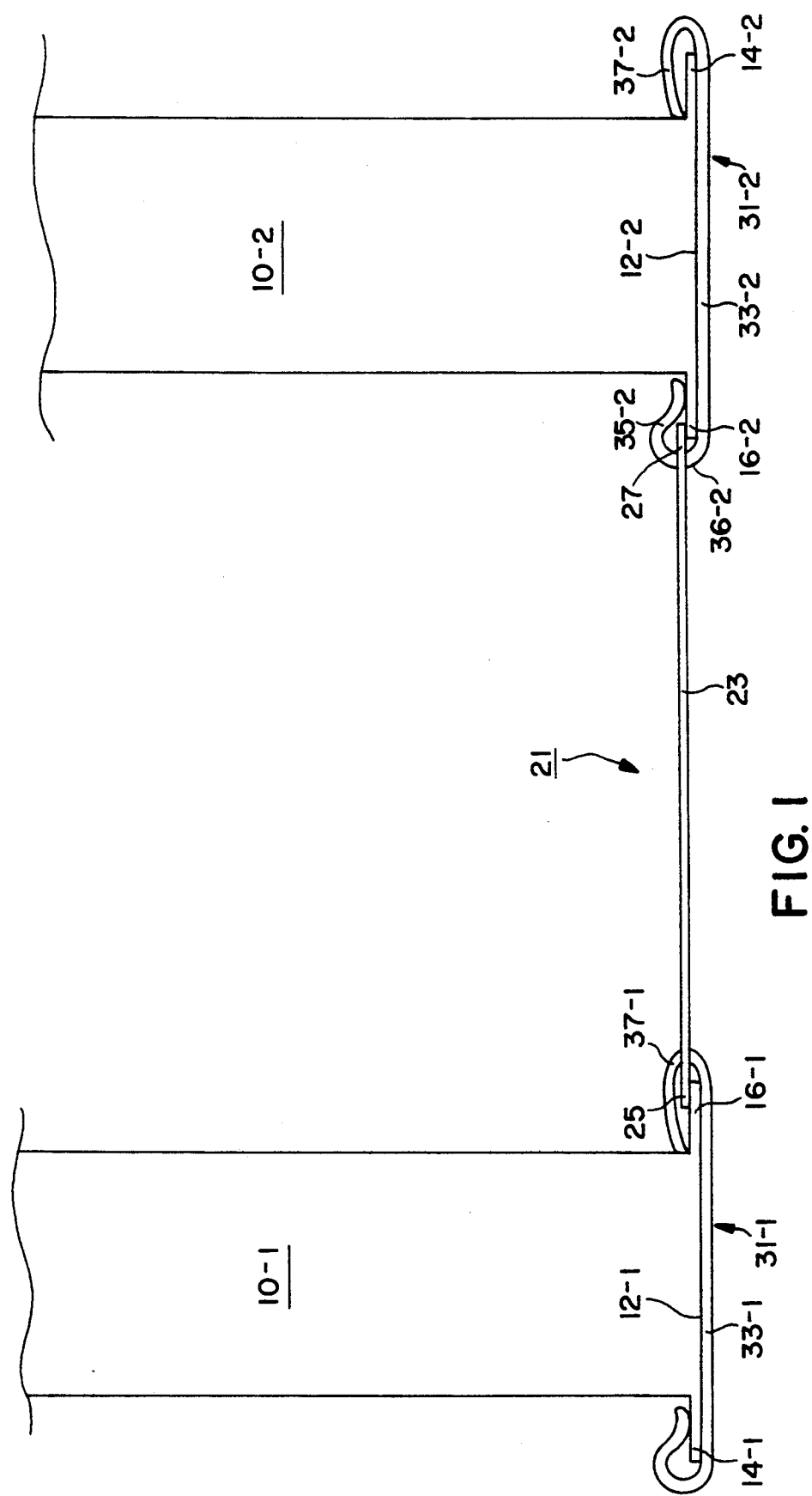
FIG. 1 is a front fragmentary view of a pair of adjacent I-beams to which one embodiment of an assembly constructed according to the teachings of the present invention has been attached.
Figure 2:
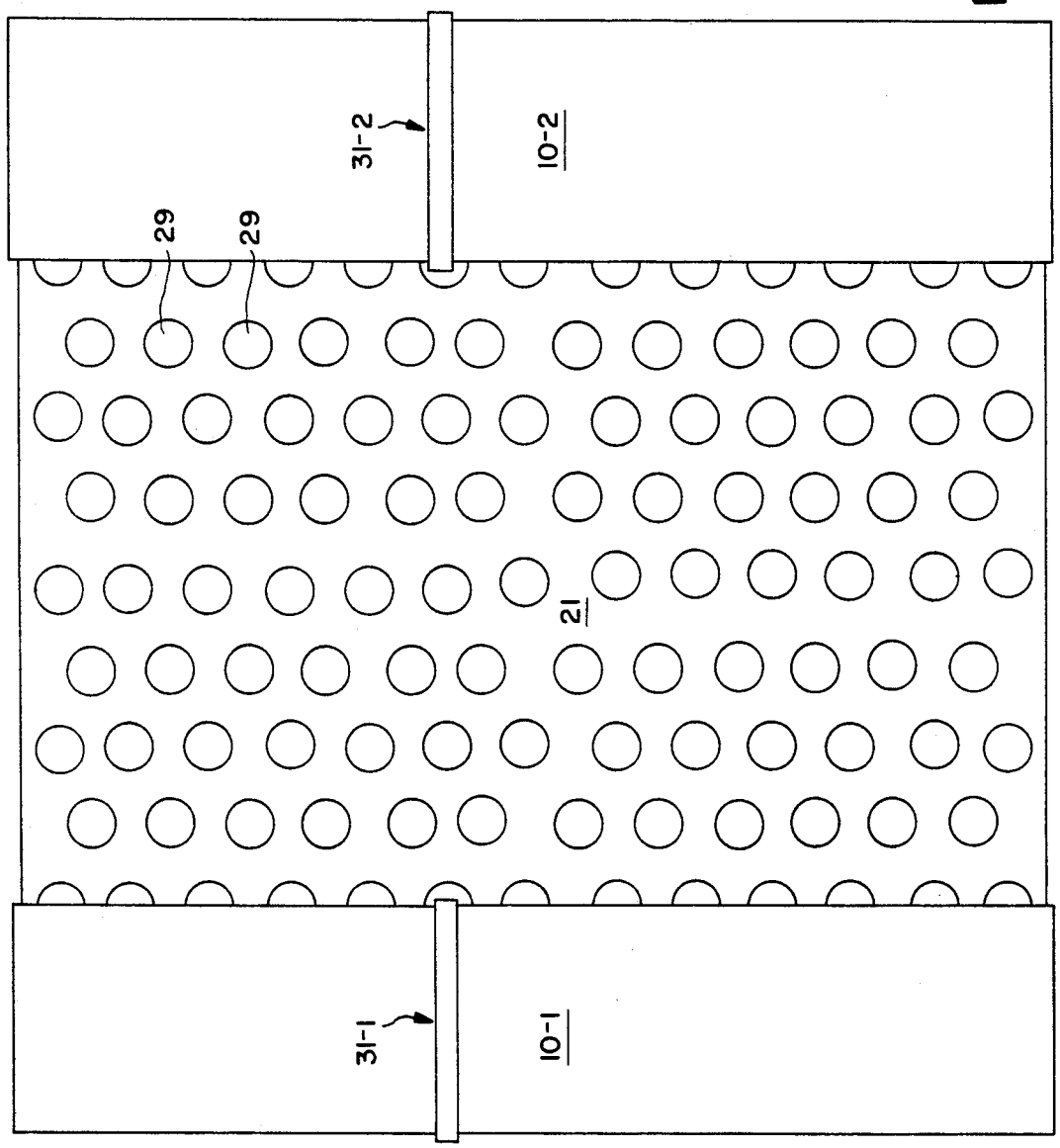
FIG. 2 is a bottom view of the pair of adjacent I-beams and assembly shown in FIG. 1.

Referring now to the drawings and more particularly to FIGS. 1 and 2, there are shown a pair of adjacent, parallel I-beams 10-1 and 10-2 of a bridge or similar structure, I-beams 10-1 and 10-2 defining a pair of bottom surfaces 12-1 and 12-2, respectively, a pair of outer flanges 14-1 and 14-2, respectively, and a pair of inner flanges 16-1 and 16-2, respectively.

In addition, there is shown in FIGS. 1 and 2 an assembly for preventing pidgeons from entering the space between I-beams 10-1 and 10-2, the assembly being constructed according to the teachings of the present invention and represented generally by reference numeral 21.

Figure 3:
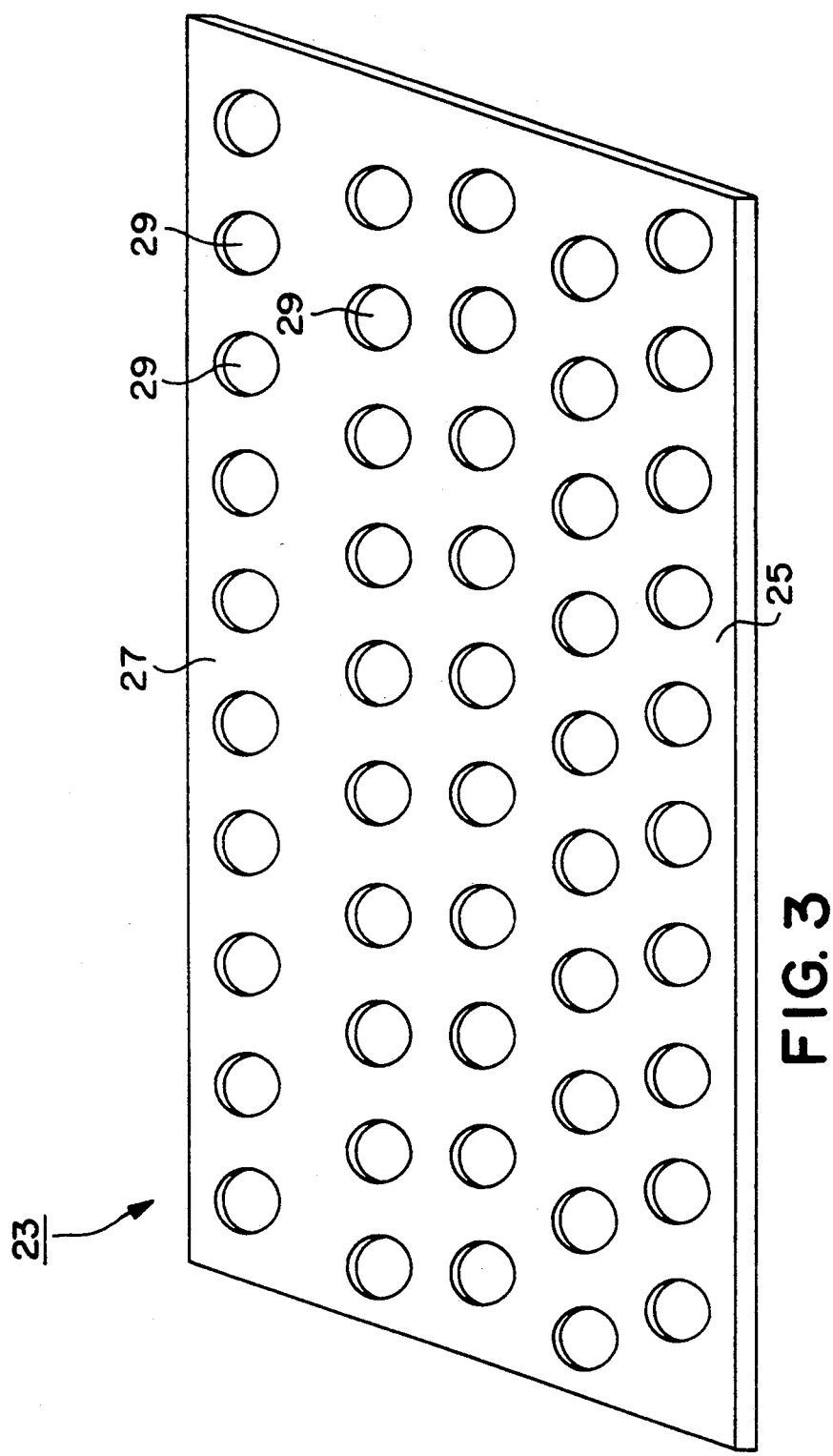
FIG. 3 is a top perspective view of the plastic sheet shown in FIG. 1.

Assembly 21 includes a generally rectangular sheet 23 (see also FIG. 3), which is sized and shaped to extend over the space between I-beams 10-1 and 10-2, with a first side 25 of sheet 23 resting on inner flange 16-1 and a second side 27 of sheet 23 resting on inner flange 16-2. A plurality of openings 29 are formed in sheet 23, openings 29 serving the following purposes. First, as will be discussed below in greater detail, openings 29 permit a pair of plastic clips to be inserted through sheet 23 for the purpose of securing sheet 23 to I-beams 10-1 and 10-2. Additionally, openings 29 reduce the surface area of sheet 23 (preferably by about one-third), thereby reducing the amount of rain, snow, leaves, and other debris that may accumulate thereon. Further, openings 29 reduce the possibility that condensation may form in the space defined by I-beams 10-1 and 10-2 and sheet 23 and reduce the possibility that sheet 23 may be shorn by the wind. As can readily be appreciated, openings 29 are sufficiently small (e.g. about 1 inch in diamater) to prevent the passage of pidgeons therethrough.

Sheet 23 is made of a material which will not cause corrosion of I-beams 10 when placed in contact therewith. Preferably, sheet 23 is made of a low-cost recycled plastic which is somewhat flexible yet retains its shape, which is resistant to degradation by exposure to ultraviolet light, resistant to low temperature impact and fracture, resistant to degradation by high ambient temperature, resistant to fraying and fretting, resistant to vermin gnawing and picking, and which has an acceptable aesthetic appearance. Examples of suitable plastics include polyolefins, polyesters, acrylics, polyamides, polyamid-imides, polyarylaulfones, polycarbonates, polyetherimides, polyethersulfones, polyetheretherketones, polyoxymethylyenes, polyimides, polytetrafluoroethylenes, polystyrenes, vinyls, polyurethanes; combinations or two or more of these polymers, and the like. Such materials may or may not include effective toxins and/or noxious additives for use in repelling or killing pidgeons. Typically, sheet 23 is formed by extrusion at about a 60 gauge thickness, and openings 29 are then formed therein by a stamping process.

Figure 4:
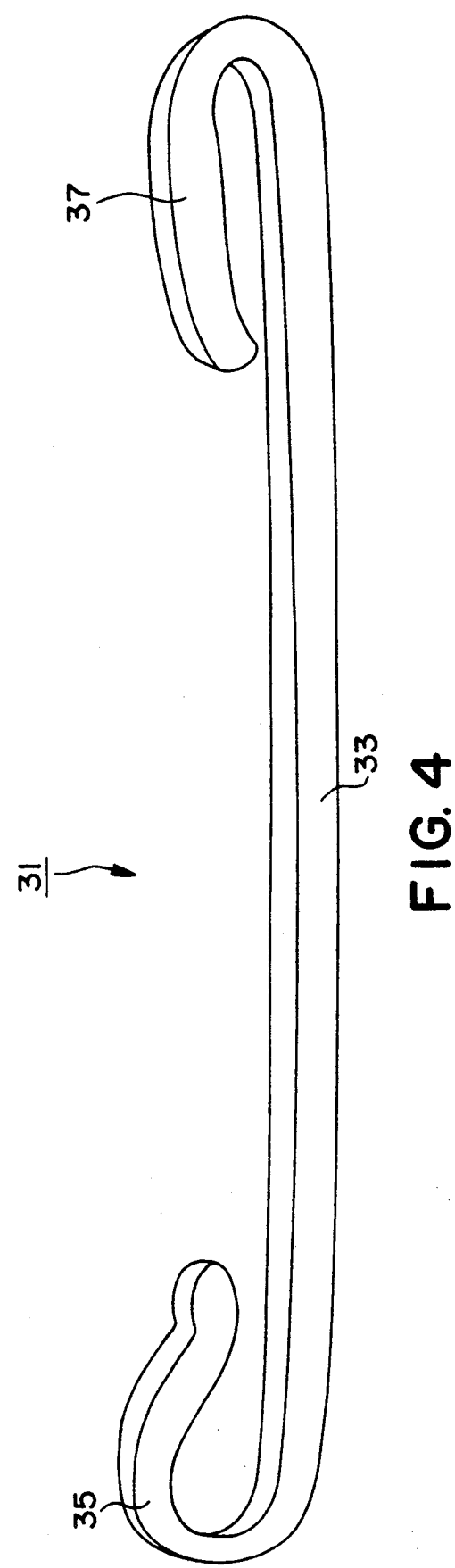
FIG. 4 is a side perspective view of one of the plastic clips shown in FIG. 1.

Assembly 21 also includes plastic fastener means for securing sheet 23 to at least one of lower inner flanges 16-1 and 16-2. In the embodiment shown, said plastic fastener means comprises a pair of generally C-shaped clips 31-1 and 31-2 (see also FIG. 4), each of which is shaped to define a bottom portion 33, a first arcuately-shaped end portion 35, and a second arcuately-shaped end portion 37, which are sized and shaped to fit around bottom 12, outer flange 14, and inner flange 16, respectively, of I-beam 10. Both end portion 35 and end portion 37 are appropriately sized and sized so that they may be inserted through openings 29 in second side 27 and first side 25, respectively, of sheet 23 in the manner to be discussed below. In order to increase the flexibility of end portion 35 for reasons to become apparent below, the neck region 36 of end portion 35 is made to be more narrow in width, i.e., about $\frac{1}{8}$ inch, than the remainder of clip 31, which is about 3/16-$\frac{1}{4}$ of an inch in width. In addition, end portion 35 is given an upwardly-looped or buckled shape, as compared to end portion 37, for reasons to become apparent below.

Clips 31-1 and 31-2 are also made of a material which will not cause corrosion of I-beams 10 when placed in contact therewith. Preferably, clips 31 are made from a plastic having the same characteristics described above in connection with sheet 23. Accordingly, clips 31 may be formed from one or more of the plastics listed above, typically by injection molding.

To mount assembly 21 on a pair of adjacent I-beams 10-1 and 10-2, one inserts end portion 35-1 of clip 31-1 through an opening 29 disposed on side 25 of sheet 23 until sheet 23 rests at the neck of end portion 35-1. Next, clip 31-1 is mounted onto I-beam 10-1 in such a way that side 25 of sheet 23 rests on top of inner flange 16-1. Clip 31-2 is then mounted onto I-beam 10-2. End portion 35-2 of clip 31-2 is then bent upwardly so that it may be inserted into an appropriate opening 29 disposed on side 27 of sheet 23. Side 27 of sheet 23 is then placed on top of inner flange 16-2 of I-beam 10-2.

As can be readily appreciated, additional clips 31 and sheets 23 can be used to seal off the spaces between additional adjacent I-beams. For example, to seal off the space between I-beam 10-2 and a third I-beam (not shown) located in the direction opposite to I-beam 10-1, one would inserted end portion 37-2 through an opening in a second sheet, identical to sheet 23, before mounting clip 31-2 on I-beam 10-2 and would attach the opposite end of the sheet to the looped end of a third clip mounted on the third I-beam in the same manner as described above.

As can also be readily appreciated, the plastic fastener means of the present invention may consist of a single clip 31 which can be used to secure only one side of sheet 23 to the lower inner flange of one I-beam, the opposite end of sheet 23 merely resting on top of the lower inner flange of the adjacent I-beam.

Figure 5:
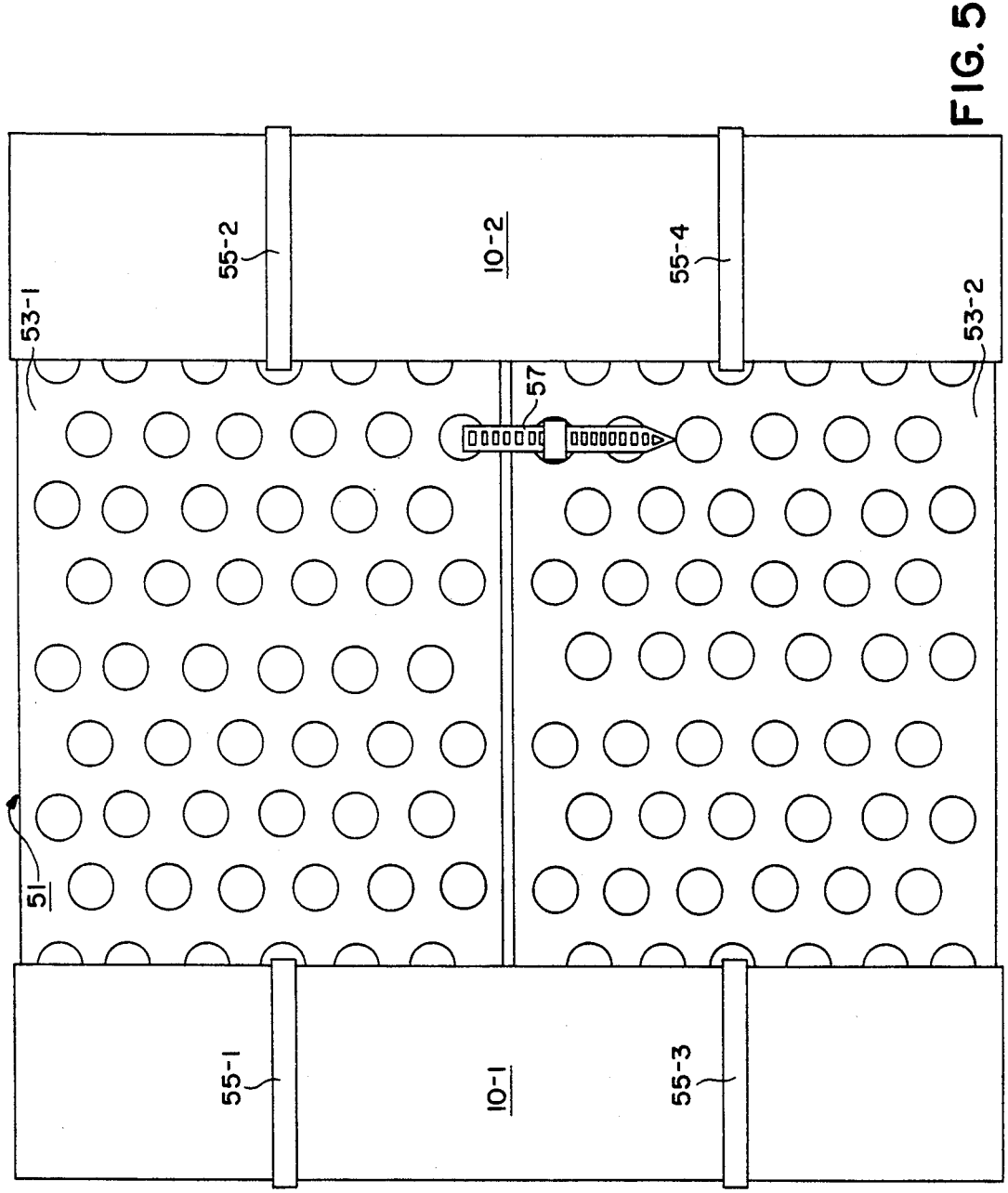
FIG. 5 is a bottom view of a pair of adjacent I-beams to which another embodiment of an assembly constructed according to the teachings of the present invention has been attached.
Figure 6:
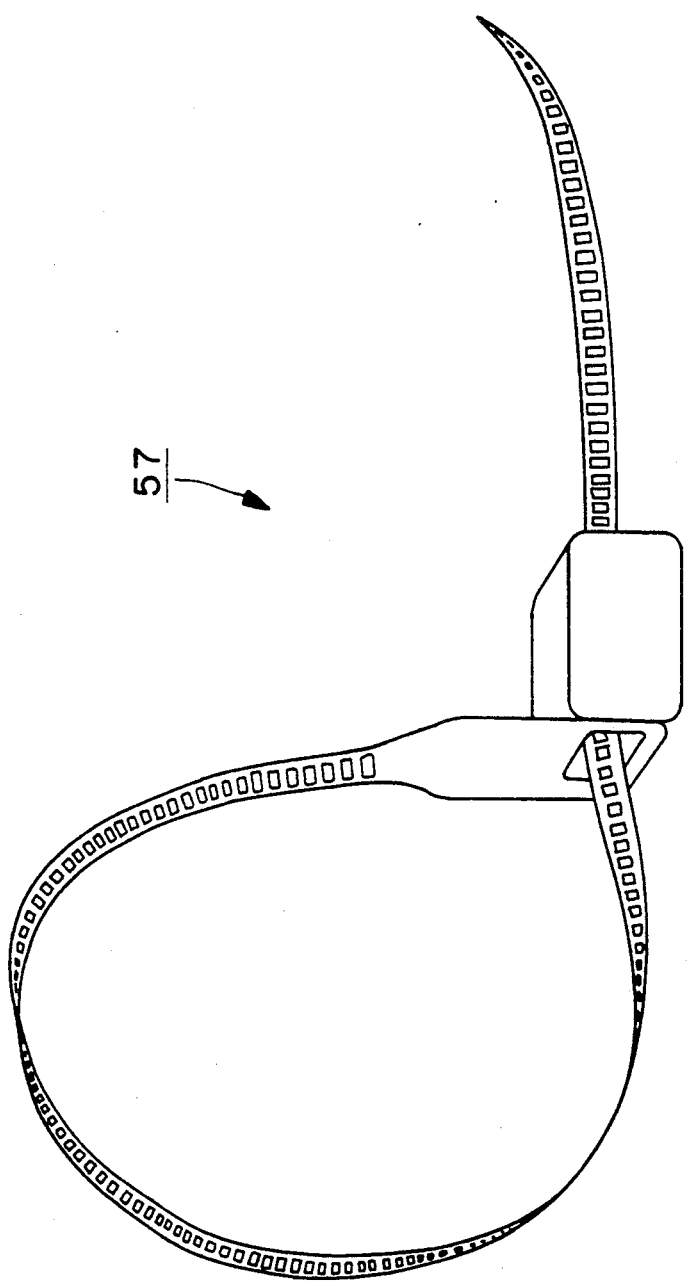
FIG. 6 is an enlarged perspective view of the plastic tie shown in FIG. 5.

Referring now to FIG. 5, there is shown another embodiment of an assembly for preventing pidgeons from entering the space between a pair of adjacent I-beams 10-1 and 10-2, the assembly being constructed according to the teachings of the present invention and represented generally by reference numeral 51.

Assembly 51 includes a pair of generally rectangular sheets 53-1 and 53-2. Sheets 53 are virtually identical in construction and composition to sheet 23 of assembly 21, the only difference between sheets 53 and sheet 23 being that sheets 53-1 and 53-2 are only one-half as long as sheet 23.

Assembly 51 also includes a plurality of generally C-shaped clips 55-1 through 55-4, which are identical in construction and composition to clips 31-1 and 31-2 of assembly 21. Clips 55-1 through 55-4 are used to secure sheets 53-1 and 53-2 to I-beams 10-1 and 10-2 in the same way that clips 31-1 and 31-2 are used to secure sheet 23 to I-beams 10-1 and 10-2.

Assembly 51 also includes a plastic tie 57, which may be looped through adjacent openings in sheets 53-1 and 53-2 for the purpose of keeping the sides of sheets 53-1 ad 53-2 close together, e.g., where a strong gust of wind is blown thereagainst.

One situation in which assembly 51 might be well-suited for use is the case in which the I-beams of a bridge run perpendicular to the flow of traffic passing thereunder. In such a case, it may be undesirable to prevent all traffic from passing under the bridge while attachment of the present assembly to the I-beams of the bridge takes place. However, using assembly 51 one can, for example, prevent traffic from passing under one-half of the bridge while one of sheets 53 is installed and then, after its installation, re-open traffic for that half of the bridge while installation of the other of sheets 53 takes place.

As can readily be appreciated, while sheet 23 of assembly 21 and sheets 53-1 and 53-2 of assembly 53 have been shown mounted on a pair of adjacent I-beams using a pair of clips, i.e., one on each end of the sheet, it may be desirable to use more than one clip to secure each end of the sheet to its respective I-beam.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. An assembly for preventing pigeons from entering the space between a pair of adjacent I-beams of a bridge, each of the pair of adjacent I-beams having a bottom surface, a lower inner flange extending towards the space between the pair of adjacent I-beams, and a lower outer flange extending away from space between the pair of adjacent I-beams, the assembly comprising:
   a. a plastic sheet, said plastic sheet being dimensioned so as to extend over the space between the pair of adjacent I-beams and to rest on top of the lower inner flanges of the pair of adjacent I-beams, said plastic sheet having a plurality of openings spaced thereover, said openings being sufficiently small to prevent the passage of pigeons therethrough;
   b. a first clip for clipping the plastic sheet onto one of the I-beams; and
   c. a second clip for clipping the plastic sheet onto the other I-beam;
   d. each clip comprising an elongated strip of plastic material that is flexible yet will retain its shape and which is bent back over itself at each end in its normal condition to form a C-shape having arcuate-shaped end portions, the elongated strip being sized in cross-section so that it can be inserted from an end into an opening in the plastic sheet, the clip being sized and shaped so that it can clip onto the bottom of an I-beam with each end thereof engaging one flange, the elongated strip being bent back at one end in a looped shaped to facilitate insertion of the end through said opening after said clip has been clipped onto the bottom of said I-beam.

2. The assembly as claimed in claim 1 wherein said plastic sheet is made of a material selected from the group consisting of polyolefins, polyesters, acrylics, polyamides, polyamid-imides, polyarylaulfones, polycarbonates, polyetherimides, polyethersulfones, polyetheretherketones, polyoxymethyenes, polyimides, polytetrafluoroethylenes, polystyrenes, vinyls, polyurethanes, and a combination of two or more of these polymers.

3. The assembly as claimed in claim 1 wherein said first and said second clips are made of a material selected from the group consisting of polyolefins, polyesters, acrylics, polylamides, polyamid-imides, polyarylaulfones, polycarbonates, polyetherimides, polyethersulfones, polyetheretherketones, polyoxymethlyenes, polyimides, polytetrafluoroethylenes, polystyrenes, vinyls, polyurethanes and a combination of two more of the polymers.

4. The assembly as claimed in claim 1 wherein said plurality of openings constitute approximately one-third of the surface area of said sheet.

5. the assembly of claim 1 wherein the elongated strip of plastic material is bent back in a generally straight configuration at the other end.

* * * * *